US012377380B2

(12) United States Patent
Lackner et al.

(10) Patent No.: US 12,377,380 B2
(45) Date of Patent: Aug. 5, 2025

(54) PASSIVE $CO_2$ CAPTURE DEVICE WITH A HELICAL SORBENT STRUCTURE

(71) Applicants: Klaus Lackner, Paradise Valley, AZ (US); Robert Page, Phoenix, AZ (US)

(72) Inventors: Klaus Lackner, Paradise Valley, AZ (US); Robert Page, Phoenix, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 489 days.

(21) Appl. No.: 17/966,669

(22) Filed: Oct. 14, 2022

(65) Prior Publication Data

US 2023/0119882 A1    Apr. 20, 2023

Related U.S. Application Data

(60) Provisional application No. 63/255,943, filed on Oct. 14, 2021.

(51) Int. Cl.
*B01D 53/04* (2006.01)
*B01D 53/06* (2006.01)

(52) U.S. Cl.
CPC ...... *B01D 53/0407* (2013.01); *B01D 2253/25* (2013.01); *B01D 2257/504* (2013.01); *B01D 2259/40083* (2013.01)

(58) Field of Classification Search
CPC .... B01D 53/04; B01D 53/0407; B01D 53/06; B01D 2253/25; B01D 2257/504; B01D 2258/06; B01D 2259/40083; Y02C 20/40

(Continued)

(56) References Cited

U.S. PATENT DOCUMENTS 3,735,563 A * 5/1973 Adams ................. F26B 21/083
96/127
4,717,401 A * 1/1988 Lupoli ............... B01D 53/0446
96/141

(Continued)

FOREIGN PATENT DOCUMENTS

CN          205627497 U   * 10/2016

OTHER PUBLICATIONS

Machine-generated English translation of CN-205627497-U, published Oct. 12, 2016.*

*Primary Examiner* — Frank M Lawrence, Jr.
(74) *Attorney, Agent, or Firm* — FULLER IP LAW LLC; Rodney J. Fuller

(57) ABSTRACT

A device for passive collection of atmospheric carbon dioxide is disclosed, including a vessel having an opening and a sorbent regeneration system. The device also includes a helical sorbent structure rotatably coupled to the vessel. The sorbent structure has a helical framework coupled to a sorbent material. The sorbent structure is movable between collection and release configurations. The collection configuration includes the sorbent structure extending upward from the vessel to expose the sorbent structure to an airflow and allow the sorbent material to capture atmospheric $CO_2$. The sorbent structure is free to rotate on an axis. The sorbent material is constrained to a helix rotating about and propagating along the axis. The release configuration includes a lid covering the opening, and the sorbent material being sufficiently enclosed inside the vessel that the regeneration system may operate to release captured $CO_2$ from the sorbent material and form an enriched gas.

20 Claims, 12 Drawing Sheets

(58) Field of Classification Search
USPC ......... 96/121–123, 125, 143, 145, 147, 150, 96/154; 95/139; 423/230
See application file for complete search history.

(56) References Cited

U.S. PATENT DOCUMENTS

| | | | | |
|---|---|---|---|---|
| 5,286,282 | A * | 2/1994 | Goodell | B60T 17/004 |
| | | | | 96/147 |
| 8,414,690 | B2 * | 4/2013 | Hansen | C12M 47/18 |
| | | | | 95/115 |
| 10,994,239 | B2 * | 5/2021 | Sano | B01J 20/08 |
| 2003/0192430 | A1 * | 10/2003 | Pearlstein | B01D 53/02 |
| | | | | 96/108 |
| 2017/0361271 | A1 * | 12/2017 | Eisenberger | B01J 20/3425 |
| 2020/0398214 | A1 * | 12/2020 | Lackner | B01D 53/04 |
| 2021/0387133 | A1 * | 12/2021 | Lackner | B01D 53/0407 |

* cited by examiner

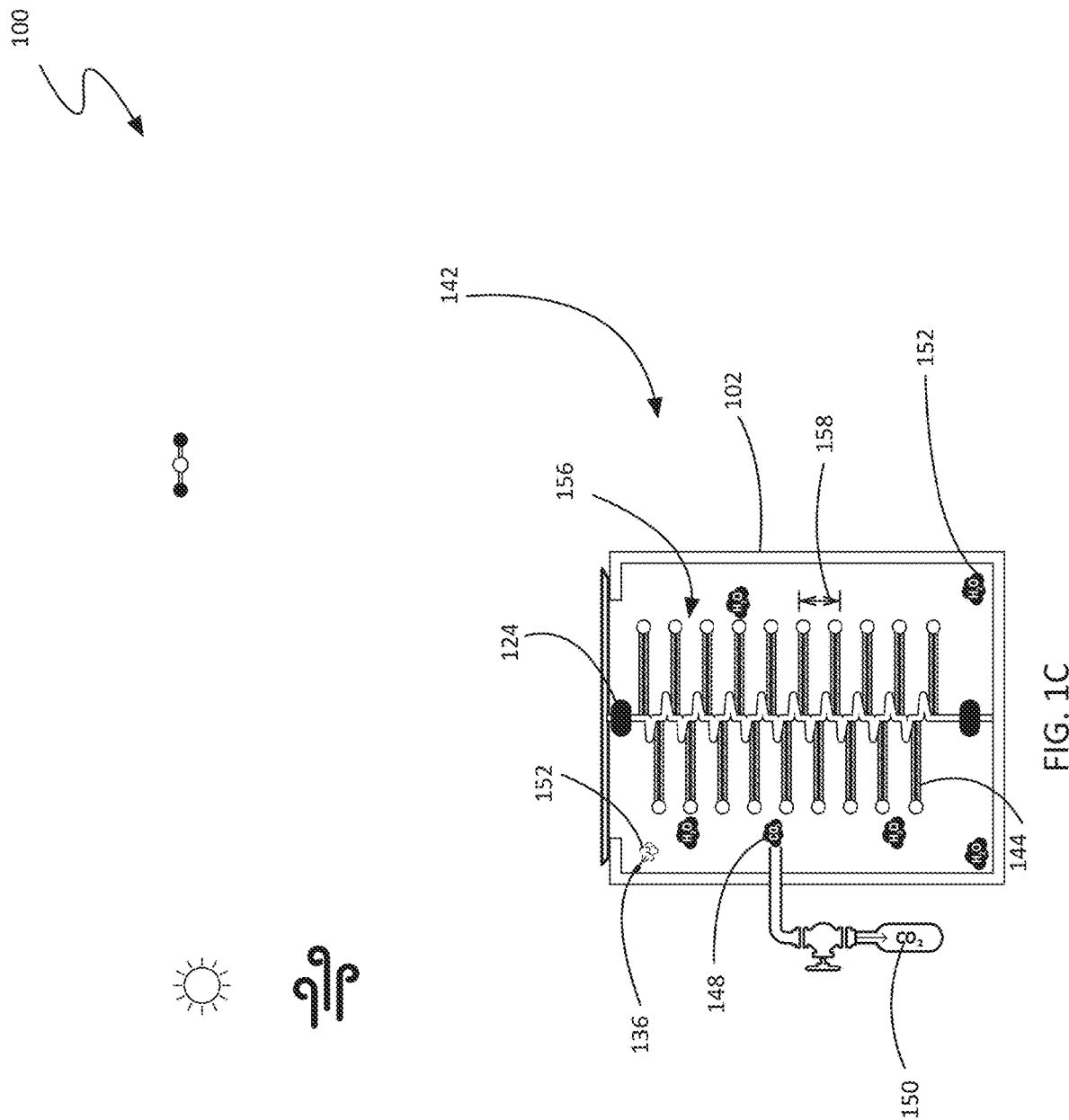

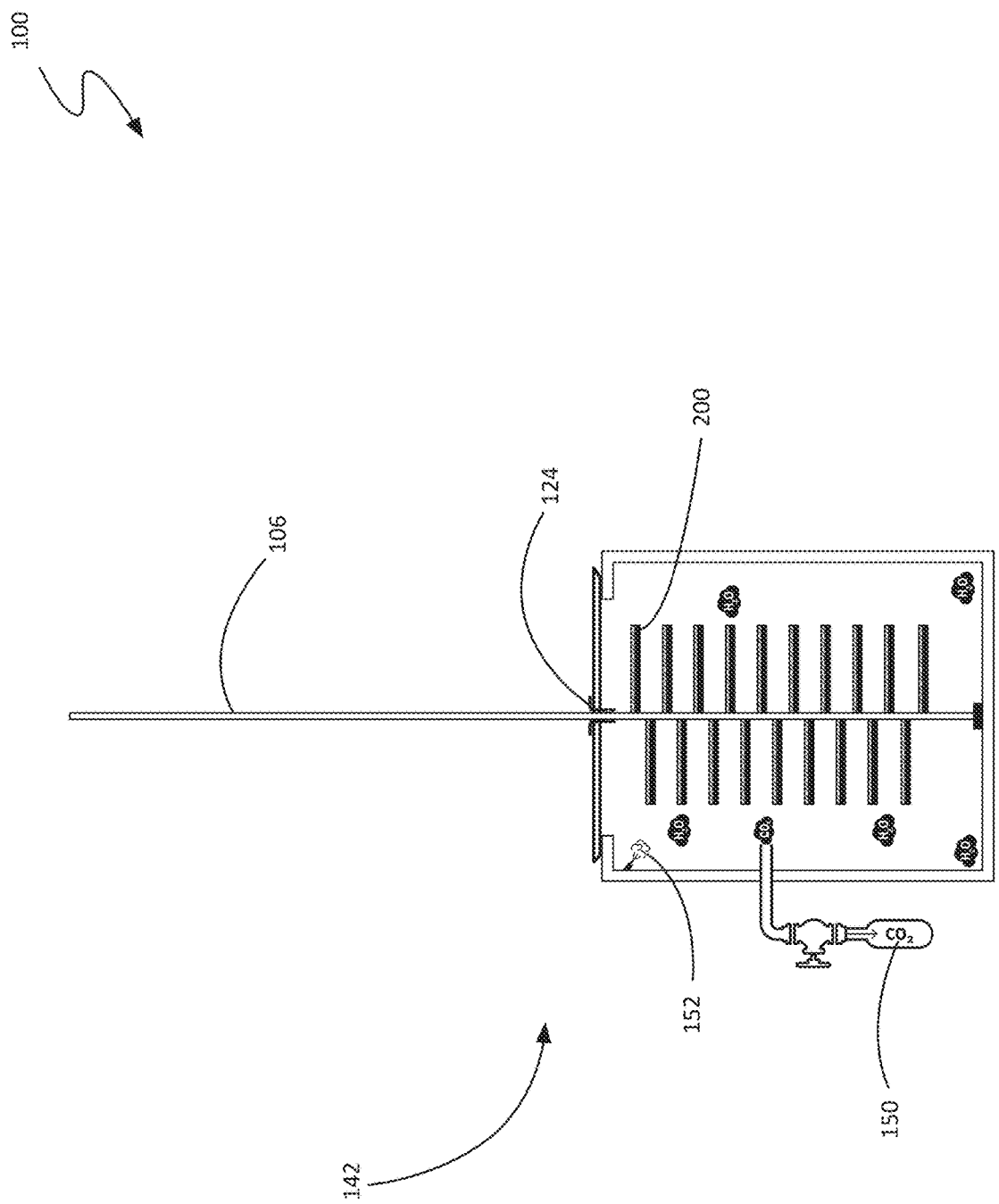

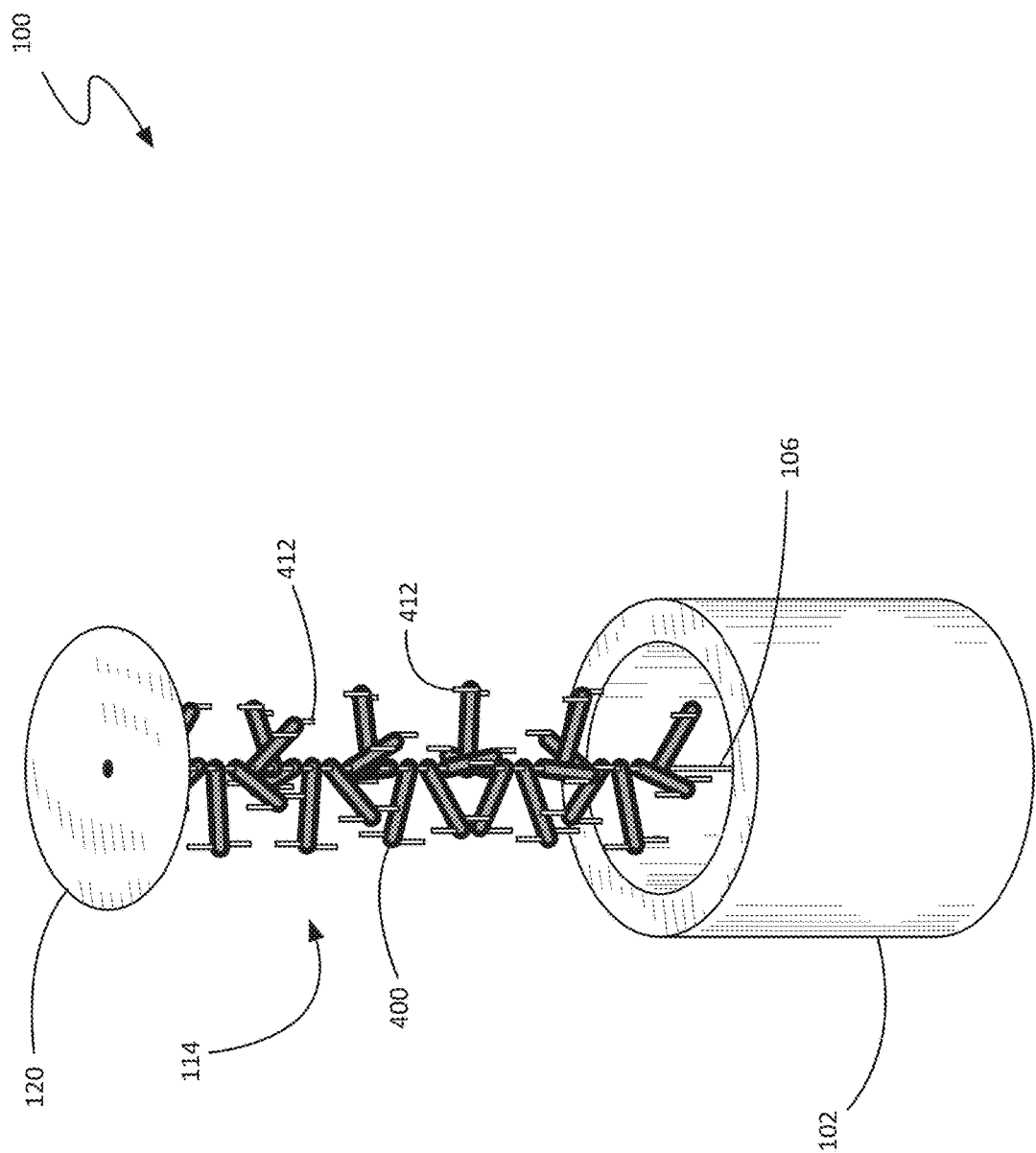

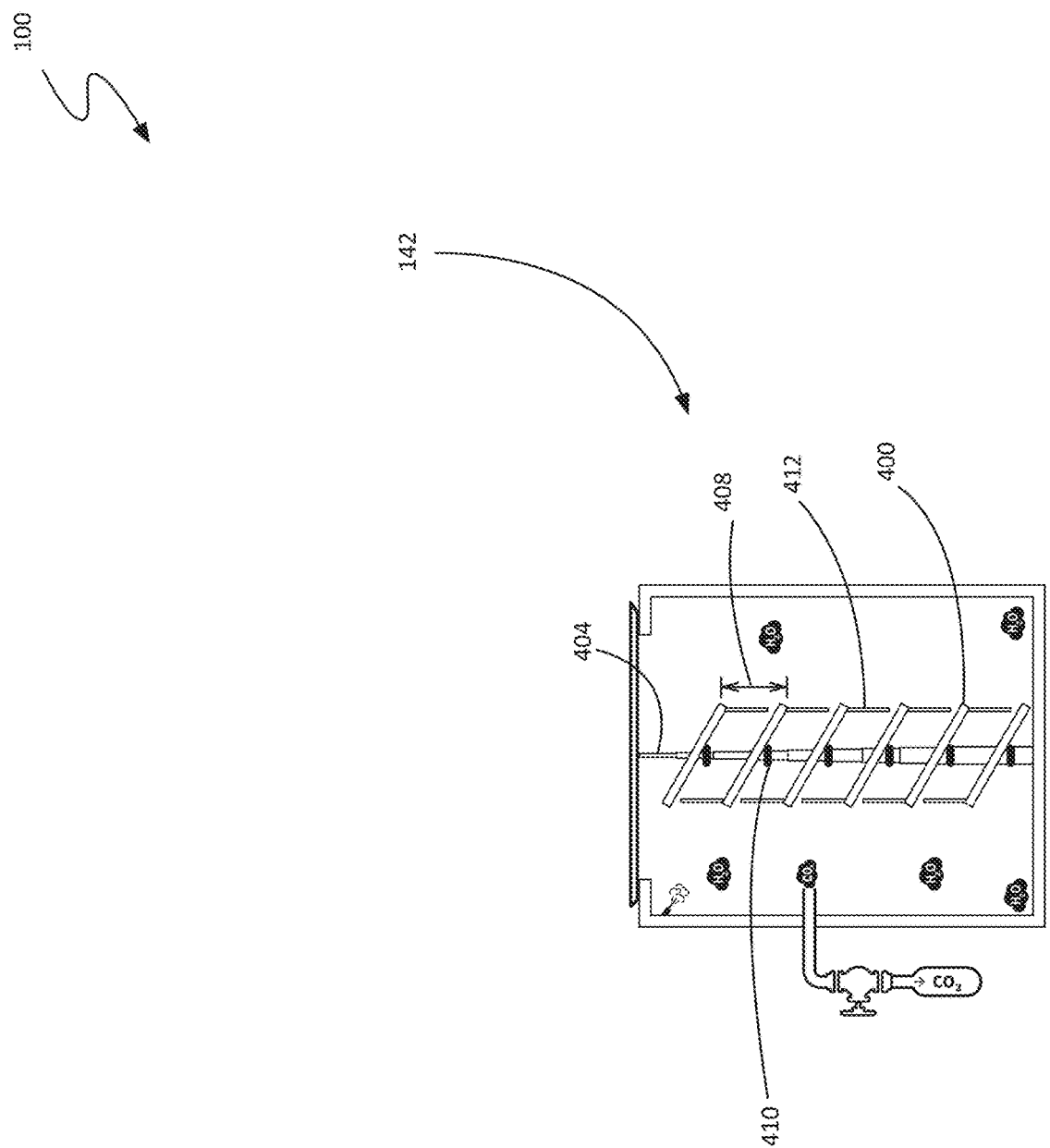

# PASSIVE CO₂ CAPTURE DEVICE WITH A HELICAL SORBENT STRUCTURE

RELATED APPLICATIONS

This application claims the benefit of U.S. provisional patent application 63/255,943, filed Oct. 14, 2021 titled "Passive $CO_2$ Capture Device with Helical Sorbent Structure," the entirety of the disclosure of which is hereby incorporated by this reference.

TECHNICAL FIELD

Aspects of this document relate generally to the passive collection of atmospheric carbon dioxide.

BACKGROUND

The need for technologies to remove carbon dioxide from ambient air has been well established. In addition to conservation, reduced-carbon processes, and on-site capture efforts, a significant amount of carbon dioxide will need to be removed from the atmosphere to avoid a looming climate change crisis.

Capture of carbon dioxide from ambient air at an affordable price could become a critical tool in managing the anthropogenic carbon cycle. Air capture technology would greatly enhance the options for developing the world's energy infrastructure and would be a major asset in the fight against climate change. Combined with carbon dioxide storage technologies, air capture of $CO_2$ could compensate for $CO_2$ emissions from any source, without requiring changes to the existing infrastructure and without requiring proximity to the point of emission. Air capture technology would make it possible for existing infrastructures to live out their natural life spans, and would permit the continued use of carbon-based fuels in distributed and mobile applications, for example in the transportation sector.

Nevertheless, these technologies are still new and the early air capture processes require large amounts of energy to operate. Since the carbon dioxide in the ambient air is very dilute, atmospheric $CO_2$ collectors can quickly overrun a tight energy budget for drawing in and processing air in bulk.

A promising technology that is well adapted for capturing dilute atmospheric carbon dioxide in an energy efficient manner is passive direct air capture, or passive DAC, which is distinguished from other DAC technologies which require additional energy for the forced convection of air. Air contactor surfaces that comprise sorbent materials are exposed to passive atmospheric air flows, capturing carbon dioxide with the sorbent material to be released within an appropriate context for further processing, use, and/or storage.

The task of efficiently collecting atmospheric carbon dioxide using sorbent materials/surfaces typically means maximizing the surface area of the sorbent material that is exposed to the natural air flows. This becomes problematic in cases of high wind, which can damage the sorbent material, or even the device itself. Fortifying the device to withstand these forces can introduce additional problems and inefficiencies, as increased mass can lead to more energy being required to manipulate the position and/or temperature of the air contactor surfaces.

Additionally, when a moisture-swing sorbent material is used, excess moisture can erode the efficiency of the capture device. If that moisture cannot be quickly removed from the freshly regenerated moisture-swing sorbent, the capture stage will be delayed, and the overall output of the device reduced.

SUMMARY

According to one aspect, a device for passive collection of atmospheric carbon dioxide, includes a vessel having an opening and a sorbent regeneration system. The device also includes a helical sorbent structure rotatably coupled to the vessel through a support such that the helical sorbent structure can rotate on an axis with respect to the vessel. The helical sorbent structure has a helical framework coupled to a sorbent material. The helical sorbent structure is movable between a collection configuration and a release configuration, and the support is collapsible. The device also includes a lid covering the opening of the vessel when the helical sorbent structure is in the release configuration, and a product outlet in fluid communication with the inside of the vessel and configured to receive a product stream of enriched gas. The support is a tether rotatably coupled to at least one of the lid and the helical sorbent structure. The collection configuration includes the helical sorbent structure extending upward from the vessel to expose at least a portion of the helical sorbent structure to an airflow and allow the sorbent material of the helical sorbent structure to capture atmospheric carbon dioxide, the helical sorbent structure free to rotate with respect to the vessel on the axis. At least part of the sorbent material is constrained to a helix by the helical framework, the helix rotating about and propagating along the axis. The release configuration includes the lid covering the opening of the vessel, the support being collapsed and enclosed inside the vessel, and the sorbent material of the helical sorbent structure being sufficiently enclosed inside the vessel that the sorbent regeneration system may operate on the sorbent material to release captured carbon dioxide from the sorbent material and form an enriched gas within the vessel.

Particular embodiments may comprise one or more of the following features. The helical framework may include an elastic material formed to trace the helix rotating about and propagating along the axis. The sorbent material may include a fabric substrate coupled to at least the helical framework. The helical framework may be a compression spring biasing the helical sorbent structure toward the collection configuration. The helical framework may include a plurality of ribs extending radially from the axis. Each rib may be coupled to the sorbent material and may be slidably coupled to the support. The support may include an upper region, a lower region, and a helical groove spiraling along the support from the lower region to the upper region. The helical groove may have a collection pitch in the upper region and/or a release pitch in the lower region. The release pitch may be smaller than the collection pitch. Each rib of the plurality of ribs may be slidably coupled to the support such that the rib is engaged with the helical groove, constraining the rib to rotate about the support as the rib slides along the length of the support. The collection configuration may include at least part of the sorbent material may be constrained to the helix defined by the collection pitch of the helical groove. The release configuration may include the sorbent material being constrained to a compressed helix defined by the release pitch of the helical groove. The compressed helix may have a smaller pitch than the helix. The helical framework may include a plurality of panels moveably coupled to the support. The plurality of panels may have a fixed relative orientation with respect to each other while also free to rotate together about the axis, each panel of the plurality of panels including the sorbent material. The collection configuration may include the plurality of panels spaced along the support with a collection spacing such that the helix passes through each panel of the plurality of panels. The release configuration may include the plurality of panels having a release spacing that may be smaller than the collection spacing. The release configuration may include the sorbent material being constrained to a compressed helix having a smaller pitch than the helix.

According to another aspect of the disclosure, a device for passive collection of atmospheric carbon dioxide, includes a vessel having an opening and a sorbent regeneration system. The device also includes a helical sorbent structure rotatably coupled to the vessel through a support such that the helical sorbent structure can rotate on an axis with respect to the vessel, the helical sorbent structure having a helical framework coupled to a sorbent material. The helical sorbent structure is movable between a collection configuration and a release configuration. The device also includes a lid covering the opening of the vessel when the helical sorbent structure is in the release configuration, and a product outlet in fluid communication with the inside of the vessel and configured to receive a product stream of enriched gas. The collection configuration includes the helical sorbent structure extending upward from the vessel to expose at least a portion of the helical sorbent structure to an airflow and allow the sorbent material of the helical sorbent structure to capture atmospheric carbon dioxide, the helical sorbent structure free to rotate with respect to the vessel on the axis. At least part of the sorbent material is constrained to a helix by the helical framework, the helix rotating about and propagating along the axis. The release configuration includes the lid covering the opening of the vessel, and the sorbent material of the helical sorbent structure being sufficiently enclosed inside the vessel that the sorbent regeneration system may operate on the sorbent material to release captured carbon dioxide from the sorbent material and form an enriched gas within the vessel.

Particular embodiments may comprise one or more of the following features. the support may be collapsible, such that when the helical sorbent structure is in the release configuration, the support may be collapsed and enclosed inside the vessel. The support may be a telescoping rod coupled to the vessel and the lid. The support may be a tether rotatably coupled to at least one of the lid and the helical sorbent structure. The helical framework may include an elastic material formed to trace the helix rotating about and propagating along the axis. The sorbent material may include a fabric substrate coupled to at least the helical framework. The helical framework may be a compression spring biasing the helical sorbent structure toward the collection configuration. The helical framework may include a plurality of ribs extending radially from the axis. Each rib may be coupled to the sorbent material and may be slidably coupled to the support. The support may include an upper region, a lower region, and/or a helical groove spiraling along the support from the lower region to the upper region. The helical groove may have a collection pitch in the upper region and a release pitch in the lower region, and the release pitch may be smaller than the collection pitch. Each rib of the plurality of ribs may be slidably coupled to the support such that the rib is engaged with the helical groove, constraining the rib to rotate about the support as the rib slides along the length of the support. The collection configuration may include at least part of the sorbent material being constrained to the helix defined by the collection pitch of the helical groove. The release configuration may include the sorbent material being constrained to a compressed helix defined by the release pitch of the helical groove, the compressed helix having a smaller pitch than the helix. The helical framework may include a plurality of panels moveably coupled to the support. The plurality of panels may have a fixed relative orientation with respect to each other while also free to rotate together about the axis, each panel of the plurality of panels including the sorbent material. The collection configuration may include the plurality of panels spaced along the support with a collection spacing such that the helix passes through each panel of the plurality of panels. The release configuration may include the plurality of panels having a release spacing that may be smaller than the collection spacing. The helical sorbent structure may be slidably coupled to the support, and the support may be rotatably coupled to the vessel such that the helical sorbent structure rotates with the support, with respect to the vessel. The helical sorbent structure may be rotatably coupled to the support, and the support may be fixedly coupled to the vessel. The release configuration may include the sorbent material being constrained to a compressed helix having a smaller pitch than the helix. The sorbent material may be a moisture-swing sorbent material.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and:

FIGS. 1B and 1C are cross-sectional views of the capture device of FIG. 1A in collection and release configurations, respectively;

FIGS. 2B and 2C are cross-sectional views of the capture device of FIG. 2A in collection and release configurations, respectively;

FIGS. 4A and 4B are perspective and top views, respectively, of another embodiment of a passive $CO_2$ capture device with a helical sorbent structure; and FIGS. 4C and 4D are cross-sectional views of the capture device of FIG. 4A in collection and release configurations, respectively.

DETAILED DESCRIPTION

Figure 1A:
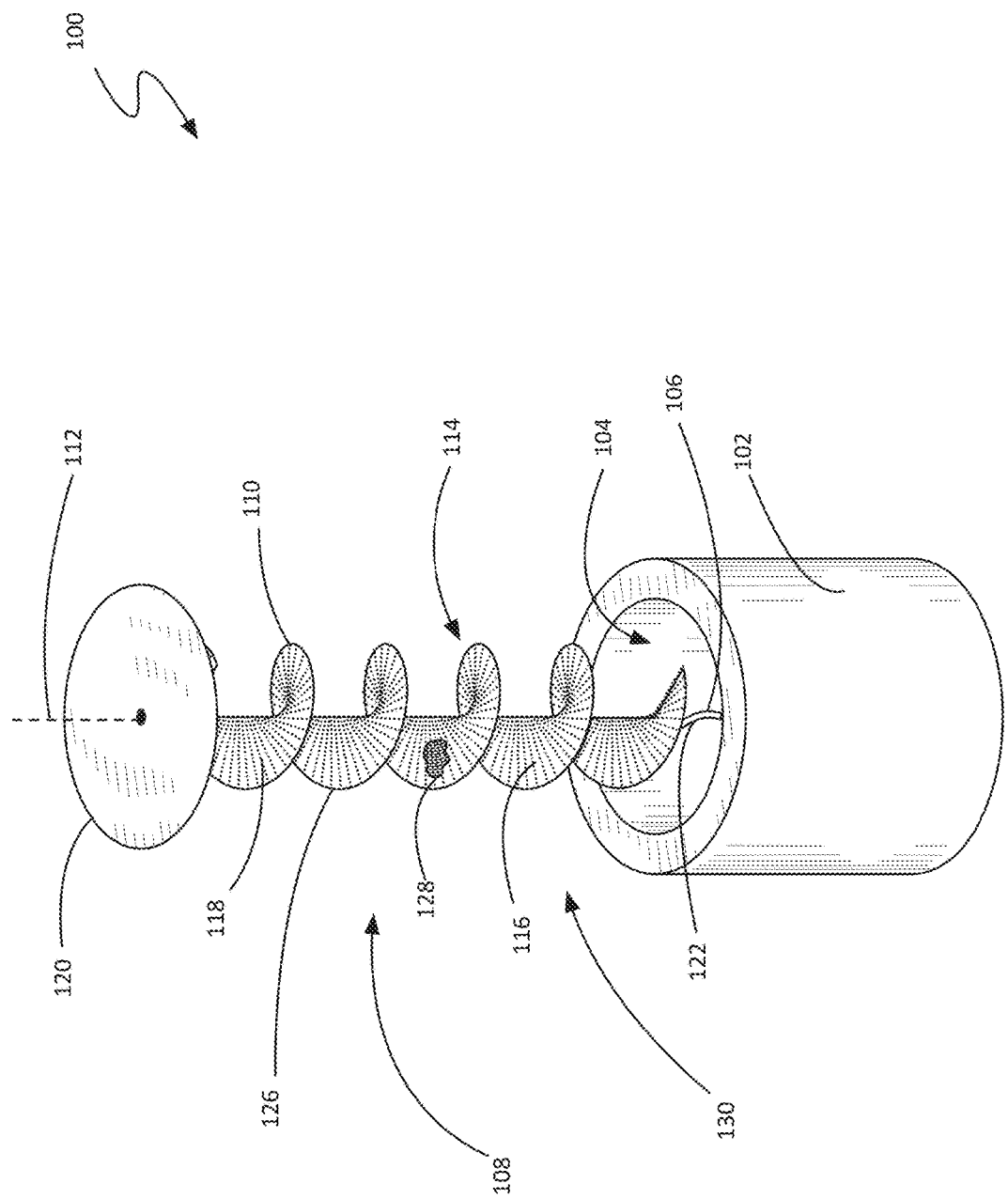
FIG. 1A is a perspective view of a passive $CO_2$ capture device with a helical sorbent structure.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

The need for technologies to remove carbon dioxide from ambient air has been well established. In addition to conservation, reduced-carbon processes, and on-site capture efforts, a significant amount of carbon dioxide will need to be removed from the atmosphere to avoid a looming climate change crisis.

Capture of carbon dioxide from ambient air at an affordable price could become a critical tool in managing the anthropogenic carbon cycle. Air capture technology would greatly enhance the options for developing the world's energy infrastructure and would be a major asset in the fight against climate change. Combined with carbon dioxide storage technologies, air capture of $CO_2$ could compensate for $CO_2$ emissions from any source, without requiring changes to the existing infrastructure and without requiring proximity to the point of emission. Air capture technology would make it possible for existing infrastructures to live out their natural life spans, and would permit the continued use of carbon-based fuels in distributed and mobile applications, for example in the transportation sector.

Nevertheless, these technologies are still new and the early air capture processes require large amounts of energy to operate. Since the carbon dioxide in the ambient air is very dilute, atmospheric $CO_2$ collectors can quickly overrun a tight energy budget for drawing in and processing air in bulk.

A promising technology that is well adapted for capturing dilute atmospheric carbon dioxide in an energy efficient manner is passive direct air capture, or passive DAC, which is distinguished from other DAC technologies which require additional energy for the forced convection of air. Air contactor surfaces that comprise sorbent materials are exposed to passive atmospheric air flows, capturing carbon dioxide with the sorbent material to be released within an appropriate context for further processing, use, and/or storage.

The task of efficiently collecting atmospheric carbon dioxide using sorbent materials/surfaces typically means maximizing the surface area of the sorbent material that is exposed to the natural air flows. This becomes problematic in cases of high wind, which can damage the sorbent material, or even the device itself. Fortifying the device to withstand these forces can introduce additional problems and inefficiencies, as increased mass can lead to more energy being required to manipulate the position and/or temperature of the air contactor surfaces.

Additionally, when a moisture-swing sorbent material is used, excess moisture can erode the efficiency of the capture device. If that moisture cannot be quickly removed from the freshly regenerated moisture-swing sorbent, the capture stage will be delayed, and the overall output of the device reduced.

Contemplated herein is a passive $CO_2$ capture device having a helical sorbent structure. The helical sorbent structure comprises one or more sorbent materials, and can be raised above a vessel to expose the sorbent to atmospheric carbon dioxide, and lowered into the vessel where the sorbent material(s) are regenerated and the captured carbon dioxide is released for further processing, refinement, use as a feedstock for other processes, or stored.

The contemplated passive $CO_2$ capture devices (hereinafter "capture device" or "device") and their helical sorbent structures provide a number of advantages over other devices and structures that have been used for passive collection of carbon dioxide. Unlike the structures used in conventional passive collection devices, the contemplated helical sorbent structure will rotate in response to wind, thereby reducing the pressure exerted on the structure when it is elevated and exposed, according to various embodiments. In some embodiments, the contemplated helical sorbent structure allows the device to continue operating in wind conditions that would require other passive capture devices to halt operation and shelter to avoid damage.

Additionally, the contemplated devices and their helical sorbent structures that are driven to rotate upon application of an air flow allow for a more efficient use of regenerating fluid, in cases where regeneration is performed with a fluid, as will be discussed in greater detail below. Additionally, the turning caused by the helical shape can be used to align the helical sorbent structure to the wind, as well as eject excess moisture, without requiring any additional energy for the motion.

While the following disclosure is focused on a passive capture device adapted for use in collecting atmospheric carbon dioxide, those skilled in the art will recognize that the contemplated devices and structures may be adapted for use with other sorbent materials directed to the capture of other substances. Furthermore, while the contemplated devices are well-adapted for use in passive capture of atmospheric gas, they may also be used as part of an active capture process (e.g., using mechanically forced air, etc.) that may or may not be directed to atmospheric harvesting (e.g., could be collecting from industrial outputs or exhaust, etc.).

Figure 1B:
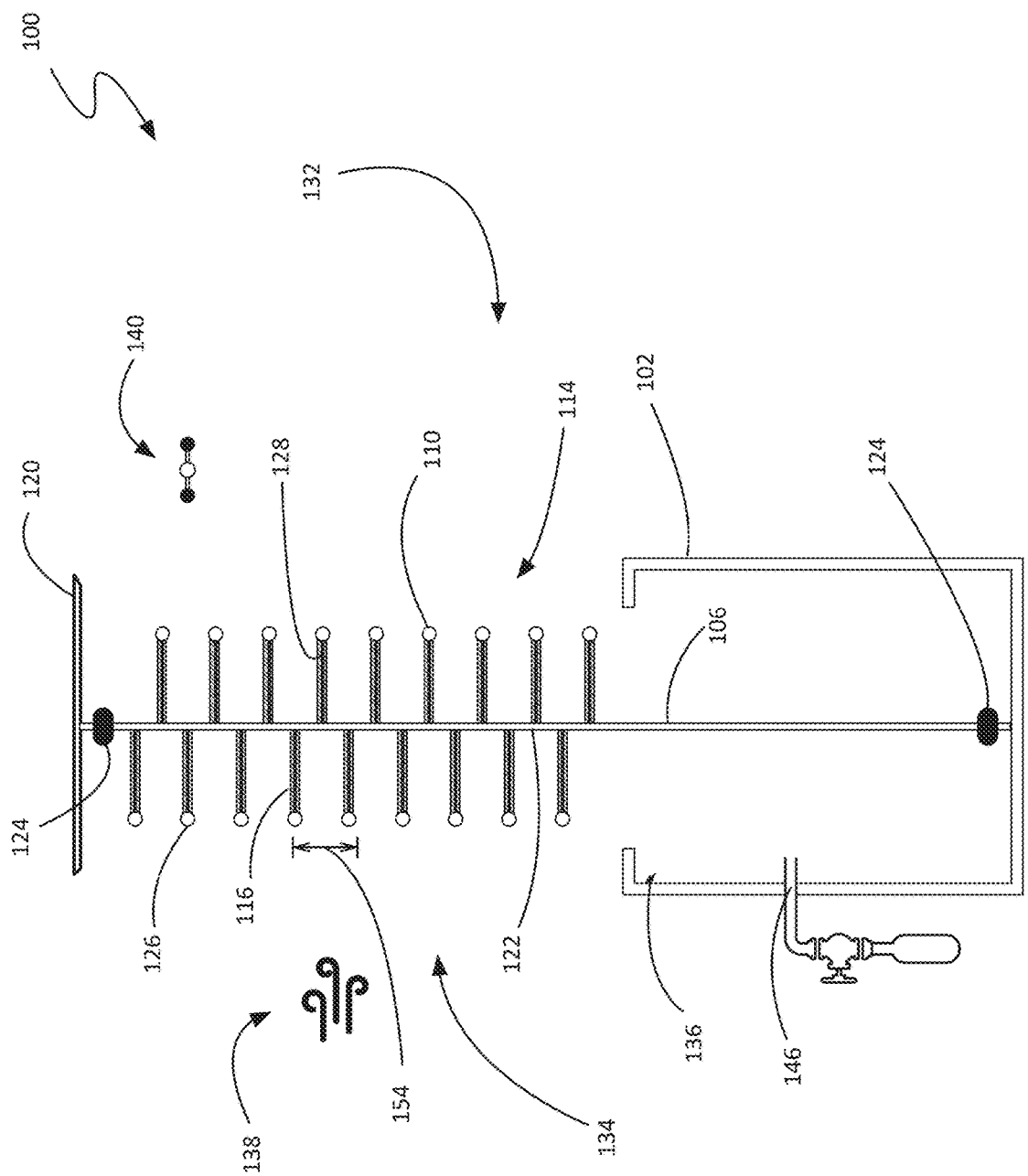

FIG. 1A is a perspective view of a non-limiting example of a passive $CO_2$ capture device having a helical sorbent structure 108. FIGS. 1B and 1C are cross-sectional views of the capture device shown in FIG. 1A in collection and release configurations 142, respectively. As shown, the device 100 comprises a helical sorbent structure 108, a vessel 102 having an opening 104, a lid 120 to cover the opening 104 during regeneration, and at least one support 106 through which the helical sorbent structure 108 is coupled to the vessel 102. The helical sorbent structure 108 is able to move up and down; in some embodiments, the helical sorbent structure 108 moves up and down along a support 106, while in other embodiments the helical sorbent structure 108 may be moved by, or through, one or more supports 106 while remaining stationary relative to said support 106. The non-limiting example shown in FIGS. 1A-1C is an example of such an embodiment, as will be discussed below.

When the helical sorbent structure 108 is raised above the vessel 102, it (or at least a portion 134 of the helical sorbent structure 108) is exposed to the natural airflow 138 and is able collect atmospheric carbon dioxide 140 using a sorbent material 116. When lowered, the helical sorbent structure 108 is enclosed within the vessel 102 by the lid 120 (see FIG. 1C), and the sorbent material 116 is regenerated.

In the context of the present description and the claims that follow, the helical sorbent structure 108 is a structure that is helical in nature. Specifically, it comprises a helical framework 114 that is substantially shaped like a helix 110 rotating about and propagating along an axis 112. In the context of the present description and the claims that follow, substantially shaped like a helix 110 means that the majority of the helical framework 114 is helical, allowing for deviations from the helix 110 for practical reasons (i.e., coupling to the support 106 at one or both ends by diverting the helical framework 114 inward towards the axis 112, etc.). Of course, in some embodiments the helical framework 114 may be entirely helical. The helical framework 114 is coupled to one or more sorbent materials 116.

According to various embodiments, the helical sorbent structure 108 is rotatably coupled to the vessel 102 through a support 106 such that the helical sorbent structure 108 can rotate on an axis with respect to the vessel 102. This axis of rotation is also the axis 112 which defines (in part) the helix 110 which gives the helical framework 114 form. In some embodiments, some or all of the helical framework 114 may be composed of a sorbent material 116. In other embodiments, the helical framework 114 is not a sorbent itself, but rather the framework which holds sorbent materials 116.

Advantageously, the helical nature of the helical sorbent structure 108 reduces wind and environmental pressures on the capture device 100. It also allows the sorbent material 116 to be exposed from every direction, while also providing a twisting motion for capture and/or relief from excess moisture.

The process of capturing and harvesting the atmospheric carbon dioxide 140 is agnostic with respect to the sorbent material 116 used, so long as the sorbent material 116 can be supported by the helical sorbent structure 108 (specifically, the helical framework 114) and is amenable to a capture/release cycle. Depending on the nature of the sorbent material 116 used, the sorbent regeneration system 136 within the vessel 102 will vary in what regeneration medium is used, and how the resulting product is collected and processed.

Examples of sorbent materials 116 include, but are not limited to, anionic exchange materials such as resins, and strong base-exchange resins, exemplified by polystyrenes with quaternary ammonium ions attached to the styrene structure. In some embodiments, the sorbent material 116 may be a moisture swing sorbent material 118, meaning it is moisture sensitive and can be regenerated by exposure to moisture alone. In other embodiments, the sorbent material 116 may be a more conventional material, like amine based sorbents that are used for thermal swings.

According to various embodiments, the sorbent material 116 may be shaped or structured to enhance its exposure to natural air flows. It may take on a variety of forms including, but not limited to, flat, bristled (e.g., tooth-brush like, etc.), undulating (e.g., waves in one or more directions, etc.), pleated, pocketed (e.g., a quilted material having pockets of sorbent material 116, etc.), textile-like (e.g., spun fiber, woven rope, woven mat, rug, etc.), and the like.

The helical framework 114 is what holds the sorbent material 116 and gives the helical sorbent structure 108 it's helical shape. In some embodiments, the helical framework 114 may trace the perimeter or edge of the helix 110. In other embodiments, the helical framework 114 may comprise a number of segments that act as a frame to hold a sorbent material 116 in place as a helical surface. In still other embodiments, the helical framework 114 may comprise a plurality of elements, each having a sorbent material 116 and shaped in such a way that their relative orientation and spacing along the axis 112 results in a helical surface (or helicoid) that may be intermittent or disjointed. These three non-limiting examples will be discussed in greater detail, below. It should be recognized, however, that other helical frameworks 114 may be used to support the sorbent material 116 and give the helical sorbent structure 108 the desired helical shape, and that the contemplated device 100 may be adapted for use with these and other helical frameworks 114.

As mentioned, in some embodiments, the helical framework 114 may provide a boundary or edge of a helical surface (essentially, the helix 110 itself), to which a sorbent material 116 may be attached to form the helical sorbent structure 108. FIGS. 1A-1C show a non-limiting example of such a helical framework 114. As shown, in some embodiments, the helical framework 114 comprises an elastic material 126 formed to trace the helix 110 rotating about and propagating along the axis. In the context of the present description and the claims that follow, an elastic material 126 is a material that can be given a shape, then deformed with the application of a force. Removing the force results in the elastic material 126 assuming the original shape. Examples include, but are not limited to, thermoplastics, polymers, wood, and metals.

In some embodiments, the helical framework 114 may resemble a spring. For example, in one embodiment, the helical framework 114 may be a compression spring 130. The compression spring 130 may bias the helical sorbent structure 108 toward the collection configuration 132 shown in FIG. 1B.

In some embodiments where the helical framework 114 traces the helix 110, the sorbent material 116 may be attached to the helical framework 114 to form a helicoid. Many sorbent materials are brittle and hard to form as flexible sheets. In some embodiments, the sorbent material 116 may comprise a sorbent that is coating or infused into a fabric substrate 128. The fabric substrate 128 is shown through a cut-out in FIG. 1A. The resulting helical sorbent structure 108 may resemble a sail. In some embodiments, this helical path may be biased to have a larger radius, but is held in its shape by the constraint of a sorbent material 116, which may be a fabric or employ a fabric or other flexible material as a substrate.

The helical sorbent structure 108 is rotatably coupled to the vessel 102 and/or the lid 120 through one or more supports 106. In some embodiments, a support 106 may be of a fixed, constant length. See, for example, the support 106 shown in FIGS. 2A-2C. In other embodiments, a support 106 may be collapsible and able to change size. See, for example, the telescoping rod 404 shown in FIGS. 4A-4D. In the context of the present description and the claims that follow, a collapsible support 106 is a support 106 that can change size such that when the helical sorbent structure 108 is enclosed in the vessel 102 by the lid 120, the support 106 is collapsed and also enclosed inside the vessel 102.

In some embodiments, a collapsible support 106 may be rigid, and able to change size in one direction. In other embodiments, including the non-limiting example shown in FIGS. 1A-1C, a collapsible support 106 may be a tether 122. In the context of the present description and the claims that follow, a tether 122 is a flexible support 106, able to change dimension by changing shape. Examples include cables, ropes, chains, wires, and the like. In some embodiments, the tether 122 is rotatably coupled to at least one of the lid 120 and the helical sorbent structure 108.

In some embodiments, a tether 122 may be used to hang the helical sorbent structure 108 from the lid 120 or some other structure that is configured to raise and lower the helical sorbent structure 108 into and out of the vessel 102. As an option, a tether 122 may also be used to couple the helical sorbent structure 108 to the bottom of the vessel 102, to prevent it from swinging in the wind. The use of such supports 106 may facilitate the sealing of the vessel 102 for regeneration.

As previously stated, the helical sorbent structure 108 is rotatably coupled to the vessel 102 and/or lid 120 through a support 106 or supports 106. In some embodiments, the helical sorbent structure 108 may be coupled to the support 106 such that they do not rotate relative to each other, though in some embodiments the helical sorbent structure 108 may be slidably coupled to the support 106. This support 106 is also rotatably coupled to one of the lid 120 and the vessel 102. According to some embodiments, this is done through a rotatable coupling 124. In the context of the present description and the claims that follow, a rotatable coupling 124 is a coupling that joins two elements and allows them to rotate relative to each other.

In other embodiments, the helical sorbent structure 108 may be rotatably coupled to the support 106, which is also coupled to one of the lid 120 and the vessel 102. This coupling may also be rotatable, but in some embodiments it may be fixed or non-rotating (but potentially capable of other types of relative motion such as sliding).

As a specific example, in the embodiment shown in FIGS. 1A-1C, the helical sorbent structure 108 is coupled to two tethers 122 through rotatable couplings 124, one coupled to the lid 120 and the other coupled to the bottom of the vessel 102. These couplings are also rotatable, though in other embodiments the lid 120 and/or vessel 102 could be coupled to one or both of the tethers in a non-rotating manner.

In some embodiments, a support 106 may simply couple with the helical sorbent structure 108 near a boundary, such as the top or the bottom. As will be shown, in other embodiments, a support 106 may pass entirely through a helical sorbent structure 108.

FIGS. 1B and 1C are cross-sectional views of the non-limiting example of the capture device 100 shown in FIG. 1A in collection 132 and release configurations 142, respectively. The helical sorbent structure 108 is movable between a collection configuration 132 and a release configuration 142.

According to various embodiments, the vessel 102, the lid 120, and the support 106 are responsible for carrying out the collection/release cycle for atmospheric carbon dioxide 140. The cycle begins with the helical sorbent structure 108 in a collection configuration 132, where it has been mechanically raised above the vessel 102. This raising of the lid 120/helical sorbent structure 108 may be performed by any means known in the art including, but not limited to, actuators and hydraulic lifts. In some embodiments, the lid 120 and helical sorbent structure 108 may be elevated by a support 106 (e.g., a hydraulic piston, etc.).

As shown, in the collection configuration 132, the helical sorbent structure 108 is moved upward from the vessel 102 to expose at least a portion 134 of the helical sorbent structure 108 to an airflow 138 and allow the sorbent material 116 of the helical sorbent structure 108 to capture atmospheric carbon dioxide 140. While in the collection configuration 132, the helical sorbent structure 108 is free to rotate with respect to the vessel 102 on the axis 112 (i.e., the axis 112 associated with the helix 110 giving shape to the helical framework 114).

Over time, the sorbent material 116 will load with atmospheric carbon dioxide 140 as it is exposed to natural airflow 138 while the helical sorbent structure 108 is in the collection configuration 132. Next (ideally when the sorbent is laden with captured $CO_2$), the helical sorbent structure 108 is moved into the release configuration 142 (see FIG. 1C), by lowering the helical sorbent structure 108 down into the vessel 102 where it is enclosed by the lid 120.

In some embodiments, the lid 120 may be coupled to a collapsible support 106 such that the lid 120 is lowered down to cover the vessel 102 as the support 106 collapses into the vessel 102. In other embodiments, the support 106 may not collapse, and the lid 120 may move independently from the support 106 such that it can seal the vessel 102 with the helical sorbent structure 108 in the release configuration 142. This will be discussed further in the context of FIG. 2C.

According to various embodiments, the release configuration 142 comprises the lid 120 covering the opening 104 of the vessel 102, and the sorbent material 116 of the helical sorbent structure 108 being sufficiently enclosed inside the vessel 102 that a sorbent regeneration system 136 may operate on the sorbent material 116 to release captured carbon dioxide 144 from the sorbent material 116 and form an enriched gas 148 within the vessel 102.

Once enclosed within the vessel 102 by the lid 120, the sorbent material 116 is regenerated, releasing the captured carbon dioxide 144 and preparing the sorbent material 116 for another collection cycle. This regeneration may be performed with a regeneration medium 152, which may include heat, fog or steam, gas, vacuum, moisture, immersion in water, and the like, depending on the sorbent material 116 used.

Exposure to the regeneration medium 152 causes the captured carbon dioxide 144 to be released into the vessel 102, from which it may be extracted (e.g., using a sweep gas, as a bicarbonate brine, using a pump, displaced by liquid water, etc.). In some embodiments, the released $CO_2$ forms a $CO_2$ enriched gas 148 inside the vessel 102, which may be extracted as a product stream 150 through a product outlet 146 that is in fluid communication with the inside of the vessel 102, according to various embodiments.

In some embodiments, the helical framework 114 that provided the helical shape while the helical sorbent structure 108 was in the collection configuration 132 may take on a different shape when the helical sorbent structure 108 is moved into the release configuration 142. In other embodiments, the helical framework 114 may retain a helical shape, but with a different pitch (i.e., the thickness of a single rotation about the axis 112 along the helix 110). According to various embodiments, the release configuration 142 comprises the sorbent material 116 being constrained to a compressed helix 156 having a smaller pitch 158 than the helix 110 of the collection configuration 132 (i.e., pitch 154).

In some embodiments, such as the non-limiting example shown in FIGS. 1A-1C, the helical framework 114 may comprise one or more elements that are able to bend and repeatedly change shape for the collection/release cycle without breaking. In other embodiments, the helical framework 114 may be composed of one or more rigid elements that do not individually change shape, but that together form the structure that will support the sorbent material 116 in a helical arrangement while the helical sorbent structure 108 is in the collection configuration 132 (and in some embodiments, also in the release configuration 142).

Figure 2A:
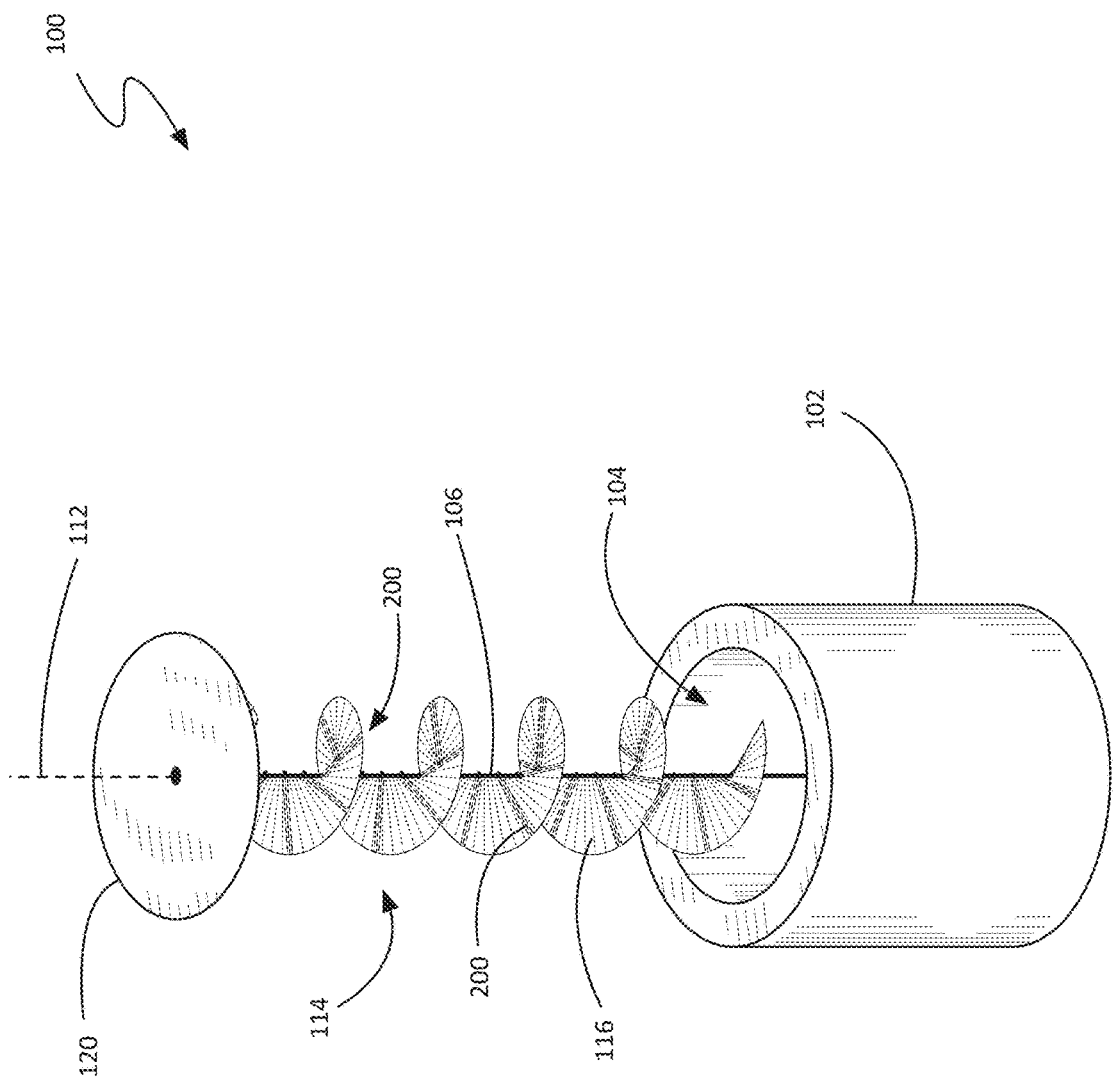
FIG. 2A is a perspective view of another embodiment of a passive $CO_2$ capture device with a helical sorbent structure.
Figure 2B:
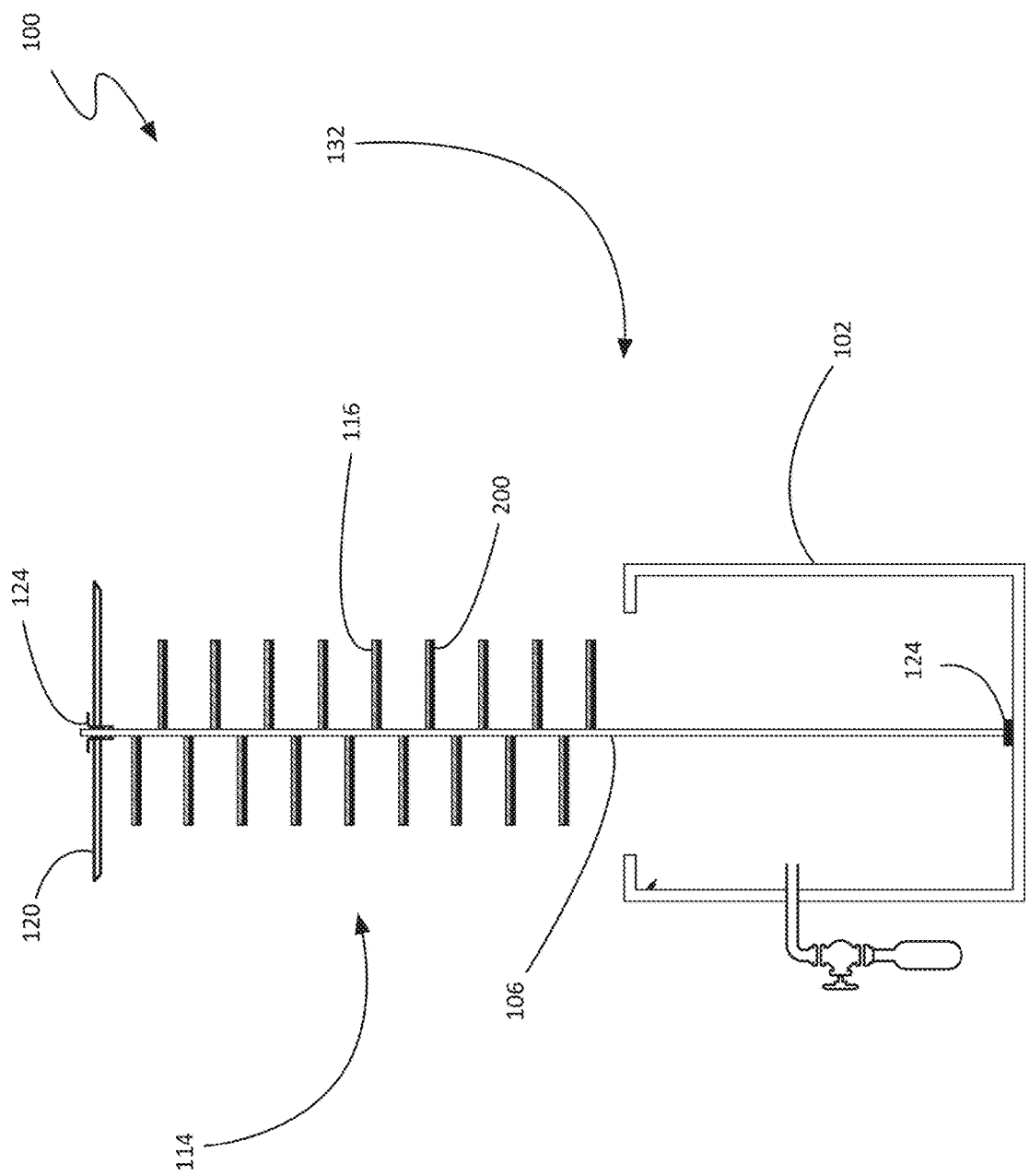

FIG. 2A is a perspective view of a non-limiting example of a passive $CO_2$ capture device 100 with a helical sorbent structure 108 comprising a helical framework 114 made up of rigid elements. Specifically, the helical framework 114 comprises a plurality of ribs 200 extending radially from the axis 112. As shown, each rib 200 is coupled to a fabric-like sorbent material 116 and also coupled to the support 106 running along the axis 112 of the helix 110. FIGS. 2B and 2C are cross-sectional views of the non-limiting example of a capture device 100 shown in FIG. 2A in collection 132 and release 142 configurations, respectively.

Unlike the collapsible supports 106 shown in FIGS. 1A-1C (i.e., tethers 122), the non-limiting example shown in FIGS. 2A-2C does not collapse into the vessel 102 when moving into the release configuration 142. Instead, the lid 120 slides down this rigid support 106. In some embodiments, the lid 120 may comprise an aperture through which the support 106 passes. As an option, in some embodiments, this aperture may further comprise a gasket or similar element to prevent the loss of any enriched gas 148 or regeneration medium 152 from within the vessel 102 through the space between the support 106 and the edge of the aperture. In other embodiments, these elements may be fabricated within a tolerance that, while not preventing all loss, is able to keep it to a tolerable level, sacrificing a bit of efficiency for reduced manufacturing expense and removal of a potential point of failure.

As previously stated, each rib 200 is coupled to a fabric-like sorbent material 116 (e.g., a sorbent material 116 comprising a fabric substrate 128, etc.) and also coupled to the support 106. In some embodiments, the rib 200 may be coupled to the support 106 such that it can slide along the support 106 as well as rotate around the support 106 (i.e., the support 106 is the axis of rotation). Speaking broadly, in some embodiments, the helical sorbent structure 108 may be rotatably coupled to the support 106 while the support 106 is fixedly coupled to the vessel 102.

In other embodiments, the ribs 200 (and thus, the helical sorbent structure 108) are slidably coupled to the support 106, but are not able to rotate relative to the support 106. Instead, the support 106 is rotatably coupled to the vessel 102 and the lid 120 such that the helical sorbent structure 108 rotates with the support 106, with respect to the vessel 102, according to various embodiments. As an option, in some embodiments, the lid 120 may rotate with the support 106 (i.e., the lid 120 may be slidably coupled to the support 106 like the ribs 200). In other embodiments, including the non-limiting example shown in FIGS. 2A-2C, the lid 120 (or some element above the lid 120, such as a lifting mechanism) may interface with the helical sorbent structure 108 and the support 106 through a rotatable coupling 124 that allows the support 106/helical sorbent structure 108 to rotate with respect to the lid 120 while also permitting the lid 120 (or other lifting element) to slide the helical sorbent structure 108 along the support 106, pulling it up and allowing it to slide back down as part of the collection/release cycle. While not as compact as embodiments of the device 100 using collapsible supports 106, the use of a rigid, non-collapsible support 106 provides the advantage of durability.

In some embodiments employing a rigid, non-collapsible support 106, the support 106 may be smooth, lacking surface features that may impede the movement of the helical sorbent structure 108. In other embodiments, the non-collapsing support 106 may comprise longitudinal surface features such as grooves or tracks that allow the helical sorbent structure 108 to slide up and down, but prevents any rotation of the helical sorbent structure 108 relative to the support 106 (e.g., an embodiment where the support 106 rotates relative to the vessel 102).

Figure 3A:
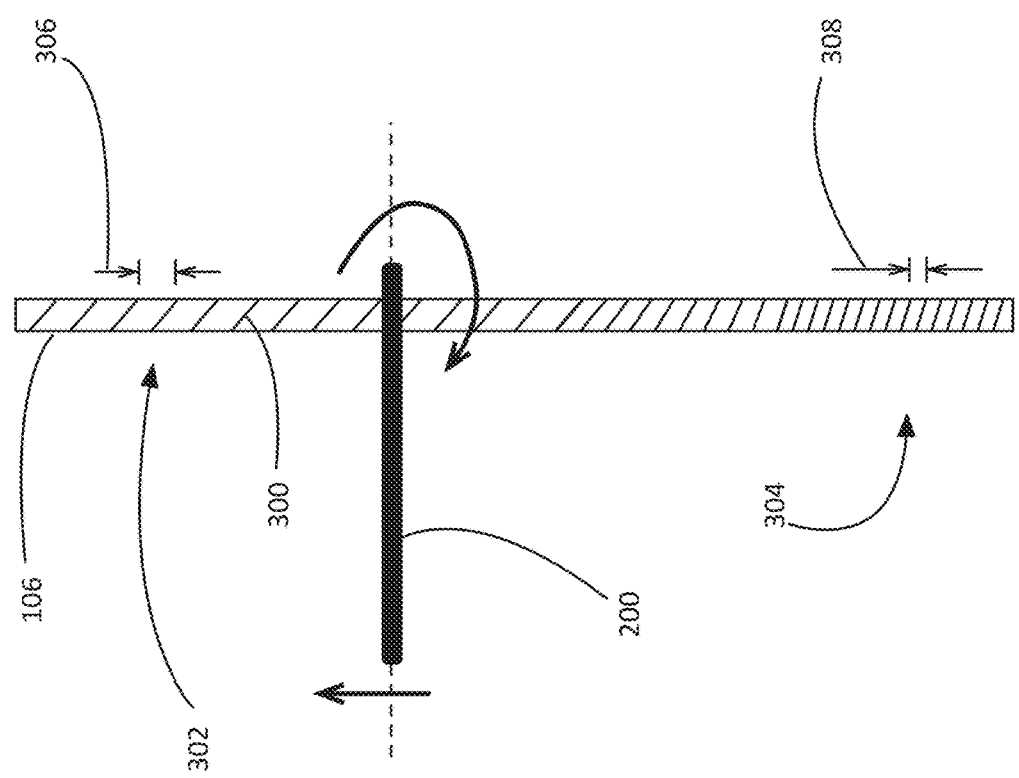
FIG. 3A is a side view of a grooved support.
Figure 3B:
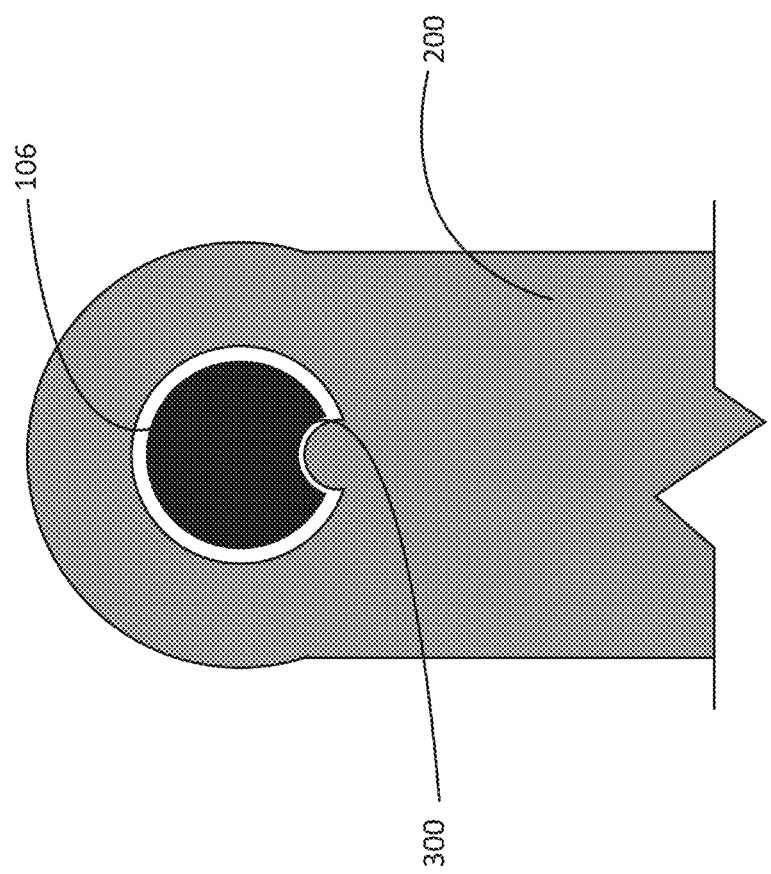
FIG. 3B is a cross-sectional view of the grooved support engaged with a helical sorbent structure.

In still other embodiments, a non-collapsing support 106 may comprise surface features that constrain the way the elements that make up the helical sorbent structure 108 (e.g., helical framework 114) move relative to the support 106 (e.g., slide, rotate, etc.). FIG. 3A is a side view of a non-limiting example of a support 106 having a helical groove 300 on its surface. FIG. 3B is a cross-sectional view of the non-collapsing support 106 of FIG. 3A engaged with part of a non-limiting example of a helical sorbent structure 108, specifically a rib 200 belonging to the helical framework 114.

As shown, the grooved support 106 comprises an upper region 302, a lower region 304, and a helical groove 300 spiraling along the support 106 from the lower region 304 to the upper region 302. It should be noted that while this discussion will continue in the context of a support 106 having a helical groove 300 engaged with a plurality of ribs 200, these concepts and functionalities could also be obtained using a support 106 having a helical track raised from the surface, with a helical framework 114 or elements of a helical framework 114 configured to engage with the track such that it constrains movement to be along the helical track.

According to various embodiments, the helical framework 114 or elements of the helical framework 114 are configured to engage with the helical groove 300 such that it constrains their movement. Continuing with the non-limiting example shown in FIGS. 3A and 3B, each rib 200 is slidably coupled to the support 106 through an aperture in one end of the rib 200. It should be noted that only one rib 200 is shown, for clarity. Inside that aperture is a tab that engages with, or sits inside, the helical groove 300, preventing the rib 200 from rotating with respect to the support 106 without also moving longitudinally along the support 106 (i.e., tracing a helix through the rotation about and propagation along an axis).

As shown, the helical groove 300 has a collection pitch 306 in the upper region 302 and a release pitch 308 in the lower region 304. The release pitch 308 is smaller than the collection pitch 306. Because the ribs 200 are constrained to rotate about the support 106 as they slide along the length of the support 106, the helical framework 114 will have the shape of a helix 110 with a changing pitch 154. Specifically, when in the collection configuration 132, at least part of the sorbent material 116 will be constrained to a helix 110 having the collection pitch 306 of the helical groove 300. When in the release configuration 142, the sorbent material 116 will be constrained to a compressed helix 156 having the release pitch 308 of the helical groove 300, the compressed helix 156 having a smaller pitch 158 than the helix 110 in the collection configuration 132.

In some embodiments, including the non-limiting examples shown in FIGS. 1 and 2, the helical framework 114 may support a fabric-like sorbent material 116 that essentially creates a helicoid. In other embodiments, the helical framework 114 may comprise a plurality of elements, each having a segment of sorbent material 116 and shaped in such a way that their relative orientation and spacing along the axis 112 results in a helical surface (or helicoid) that is intermittent or disjointed.

Figure 4B:
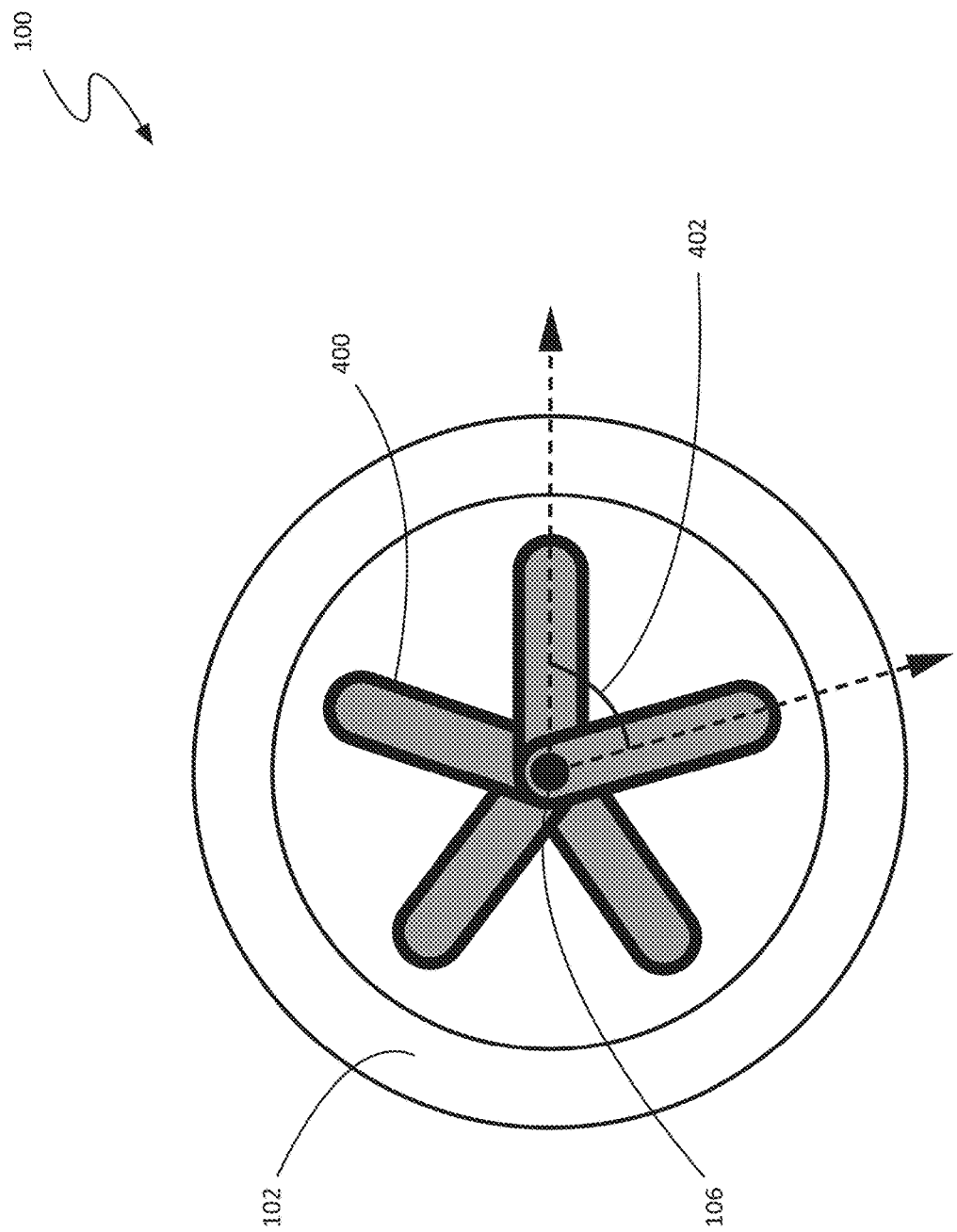

FIGS. 4A and 4B are perspective and top views, respectively, of a non-limiting example of a passive $CO_2$ capture device with a helical sorbent structure 108 having a plurality of panels 400 and a collapsible support. Like the rib elements discussed in the context of FIGS. 2 and 3, the panels 400 are individual elements that make up the helical framework 114. According to various embodiments, this plurality of panels 400 are moveably coupled to a central support 106. Unlike the ribbed embodiments previously discussed, here the panels 400 have a fixed relative orientation 402 with respect to each other while also being free to rotate together about the axis 112 (i.e., the support 106), according to various embodiments. Additionally, according to various embodiments, each panel 400 of the plurality of panels 400 has its own portion of sorbent material 116, rather than sharing a single, fabric-like sorbent surface.

In the context of the present description and the claims that follow, a relative orientation 402 is the angle between neighboring panels 400 in the helical framework 114. In some embodiments, this relative orientation 402 may be completely static, while in other embodiments there may be room for very slight deviations. In some embodiments, the relative orientation 402 between neighboring panels 400 may be held fixed through an interaction between the two panels 400 (e.g., near or along the support 106, along the far edge, etc.).

In some embodiments, each panel 400 may comprise one or more protrusions extending upward and downward such that they are in contact with the neighboring panels 400, preventing one from rotating about the support 106 without pushing the neighbors (and ultimately, the entire helical framework 114) to rotate as well, maintaining the relative orientation 402. These protrusions do not interfere with the movement of the panels 400 longitudinally, leaving them free to slide up and down the support 106. According to various embodiments, while the relative orientation 402 between panels 400 may be held fixed, the separation between neighboring panels 400 can change, a freedom that is advantageous when paired with a collapsible support 106.

Figure 4C:
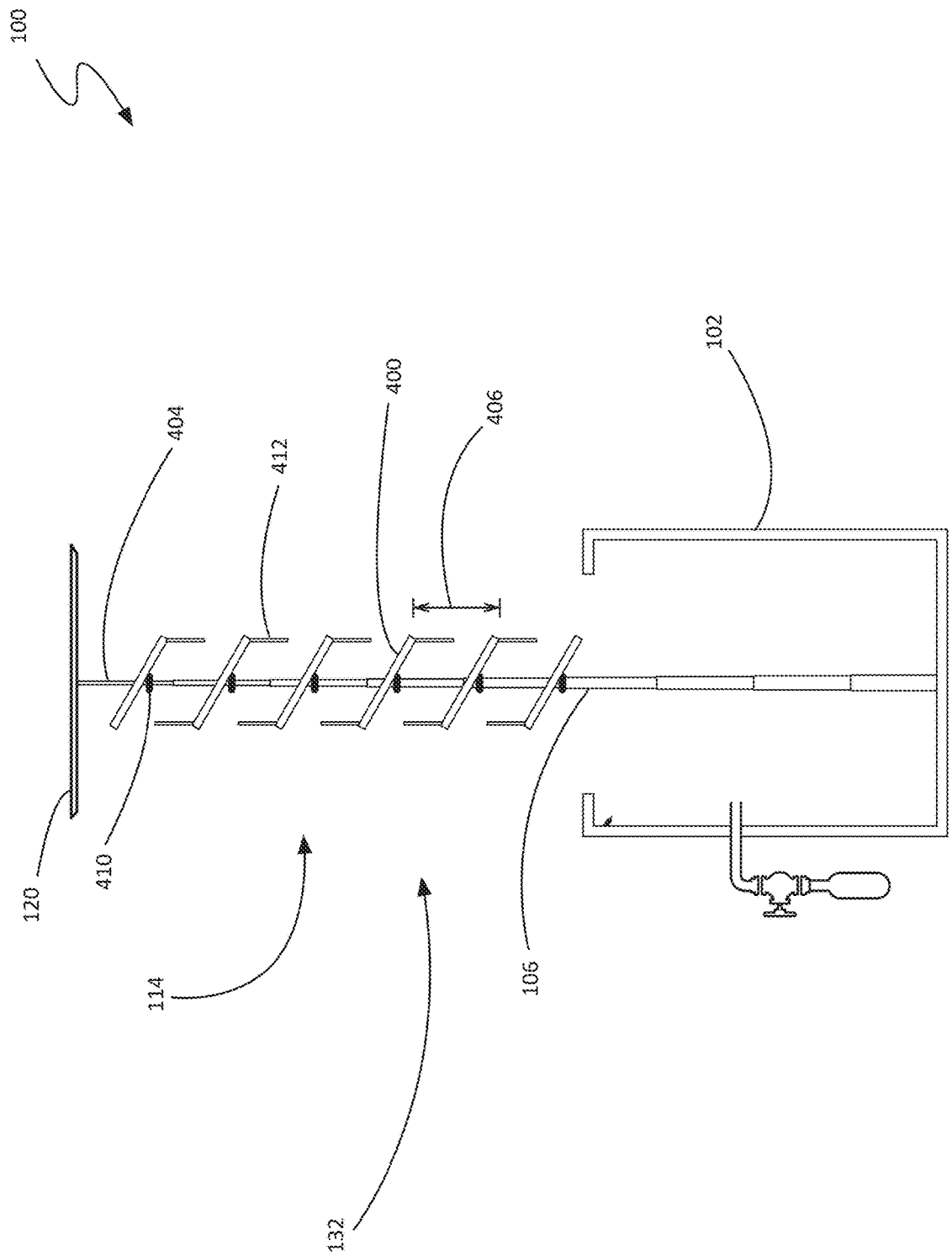

FIGS. 4C and 4D are cross-sectional views of the non-limiting example of the capture device 100 shown in FIG. 4A, in collection 132 and release 142 configurations, respectively. Comparing these two configurations demonstrates the advantage provided by pairing the use of panels 400 with protrusions 412 with a rigid but collapsible support 106. In the non-limiting example shown in FIGS. 4A-D, the support 106 is a telescoping rod 404 having nested segments that allow the length to be changed, like an antenna. The telescoping rod 404 is coupled to the vessel 102 and the lid 120, according to various embodiments. Other examples of rigid collapsible supports 106 include, but are not limited to, hydraulic or pneumatic pistons, and the like.

As shown in FIG. 4C, the collection configuration 132 comprises the plurality of panels 400 spaced along the support 106, separated by a distance hereinafter referred to as the collection spacing 406. In some embodiments, the separation between neighboring panels 400 may be uniform, while in others it may be heterogeneous. The panels 400 are spread out to this separation as the support 106 (i.e., telescoping rod 404) extends upward, with each panel 400 sliding down until it hits a stop 410. In the context of the present description and the claims that follow, a stop 410 is a surface element on the collapsible support 106 that prevents the panel 400 from moving down relative to the support 106 any further. Examples include, but are not limited to, pegs, pins, rings, and the like. In other words, each panel 400 is free to slide up and down the support, within the bounds set by the two closes stops 410 (e.g., above and below).

Though not visible in the cross sectional view, when the helical sorbent structure 108 is in the collection configuration 132, the helix 110 of the helical framework 114 passes through each panel 400 of the plurality of panels 400. In some embodiments, each panel 400 may be shaped and angled with respect to the support 106 to essentially be a segment of a single helical surface. In other embodiments, the panels 400 may be arranged in or along a helix, but not necessarily form an intermittent helicoid (e.g., the panels 400 may be angled out of the plane of the helicoid, etc.). However, such an arrangement, where the helix 110 simply passes through each panel 400, can provide the same wind-driven rotation and the associated advantages.

As shown in FIG. 4D, the release configuration 142 comprises the plurality of panels 400 now being separated by a release spacing 408 that is smaller than the collection spacing 406. According to various embodiments, as the support 106 decreases in length, the distance between neighboring stops 410 decreases, bringing the panels 400 resting on them closer together, until the helical sorbent structure 108 and the support 106 are enclosed within the vessel 102.

Where the above examples, embodiments and implementations reference examples, it should be understood by those of ordinary skill in the art that other helical sorbent structures, helical frameworks, sorbent materials, and supports could be intermixed or substituted with those provided. In places where the description above refers to particular embodiments of a passive $CO_2$ capture device with a helical sorbent structure, it should be readily apparent that a number of modifications may be made without departing from the spirit thereof and that these embodiments and implementations may be applied to other air capture technologies as well. Accordingly, the disclosed subject matter is intended to embrace all such alterations, modifications and variations that fall within the spirit and scope of the disclosure and the knowledge of one of ordinary skill in the art.

What is claimed is:

1. A device for passive collection of atmospheric carbon dioxide, comprising:
   a vessel comprising an opening and a sorbent regeneration system;
   a helical sorbent structure rotatably coupled to the vessel through a support such that the helical sorbent structure can rotate on an axis with respect to the vessel, the helical sorbent structure comprising a helical framework coupled to a sorbent material, the helical sorbent structure being movable between a collection configuration and a release configuration, the support being collapsible;
   a lid covering the opening of the vessel when the helical sorbent structure is in the release configuration; and
   a product outlet in fluid communication with the inside of the vessel and configured to receive a product stream of enriched gas;
   wherein the support is a tether rotatably coupled to at least one of the lid and the helical sorbent structure;
   wherein the collection configuration comprises the helical sorbent structure extending upward from the vessel to expose at least a portion of the helical sorbent structure to an airflow and allow the sorbent material of the helical sorbent structure to capture atmospheric carbon dioxide, the helical sorbent structure free to rotate with respect to the vessel on the axis, at least part of the sorbent material being constrained to a helix by the helical framework, the helix rotating about and propagating along the axis; and
   wherein the release configuration comprises the lid covering the opening of the vessel, the support being collapsed and enclosed inside the vessel, and the sorbent material of the helical sorbent structure being sufficiently enclosed inside the vessel that the sorbent regeneration system may operate on the sorbent material to release captured carbon dioxide from the sorbent material and form an enriched gas within the vessel.

2. The device of claim 1, wherein the helical framework comprises an elastic material formed to trace the helix rotating about and propagating along the axis, and wherein the sorbent material comprises a fabric substrate coupled to at least the helical framework.

3. The device of claim 2, wherein the helical framework is a compression spring biasing the helical sorbent structure toward the collection configuration.

4. The device of claim 1, wherein the helical framework comprises a plurality of ribs extending radially from the axis, each rib coupled to the sorbent material and slidably coupled to the support.

5. The device of claim 4:
   wherein the support comprises an upper region, a lower region, and a helical groove spiraling along the support from the lower region to the upper region, the helical groove having a collection pitch in the upper region and a release pitch in the lower region, the release pitch being smaller than the collection pitch;
   wherein each rib of the plurality of ribs is slidably coupled to the support such that the rib is engaged with the helical groove, constraining the rib to rotate about the support as the rib slides along the length of the support;
   wherein the collection configuration comprises at least part of the sorbent material being constrained to the helix defined by the collection pitch of the helical groove; and
   wherein the release configuration comprises the sorbent material being constrained to a compressed helix defined by the release pitch of the helical groove, the compressed helix having a smaller pitch than the helix.

6. The device of claim 1:
   wherein the helical framework comprises a plurality of panels moveably coupled to the support, the plurality of panels having a fixed relative orientation with respect to each other while also free to rotate together about the axis, each panel of the plurality of panels comprising the sorbent material;
   wherein the collection configuration comprises the plurality of panels spaced along the support with a collection spacing such that the helix passes through each panel of the plurality of panels; and
   wherein the release configuration comprises the plurality of panels having a release spacing that is smaller than the collection spacing.

7. The device of claim 1, wherein the release configuration comprises the sorbent material being constrained to a compressed helix having a smaller pitch than the helix.

8. A device for passive collection of atmospheric carbon dioxide, comprising:
   a vessel comprising an opening and a sorbent regeneration system;
   a helical sorbent structure rotatably coupled to the vessel through a support such that the helical sorbent structure can rotate on an axis with respect to the vessel, the helical sorbent structure comprising a helical framework coupled to a sorbent material, the helical sorbent structure being movable between a collection configuration and a release configuration;
   a lid covering the opening of the vessel when the helical sorbent structure is in the release configuration; and
   a product outlet in fluid communication with the inside of the vessel and configured to receive a product stream of enriched gas;
   wherein the collection configuration comprises the helical sorbent structure extending upward from the vessel to expose at least a portion of the helical sorbent structure to an airflow and allow the sorbent material of the helical sorbent structure to capture atmospheric carbon dioxide, the helical sorbent structure free to rotate with respect to the vessel on the axis, at least part of the sorbent material being constrained to a helix by the helical framework, the helix rotating about and propagating along the axis;

wherein the release configuration comprises the lid covering the opening of the vessel, and the sorbent material of the helical sorbent structure being sufficiently enclosed inside the vessel that the sorbent regeneration system may operate on the sorbent material to release captured carbon dioxide from the sorbent material and form an enriched gas within the vessel.

9. The device of claim 8, wherein the support is collapsible, such that when the helical sorbent structure is in the release configuration, the support is collapsed and enclosed inside the vessel.

10. The device of claim 9, wherein the support is a telescoping rod coupled to the vessel and the lid.

11. The device of claim 9, wherein the support is a tether rotatably coupled to at least one of the lid and the helical sorbent structure.

12. The device of claim 8, wherein the helical framework comprises an elastic material formed to trace the helix rotating about and propagating along the axis, and wherein the sorbent material comprises a fabric substrate coupled to at least the helical framework.

13. The device of claim 12, wherein the helical framework is a compression spring biasing the helical sorbent structure toward the collection configuration.

14. The device of claim 8, wherein the helical framework comprises a plurality of ribs extending radially from the axis, each rib coupled to the sorbent material and slidably coupled to the support.

15. The device of claim 14:
wherein the support comprises an upper region, a lower region, and a helical groove spiraling along the support from the lower region to the upper region, the helical groove having a collection pitch in the upper region and a release pitch in the lower region, the release pitch being smaller than the collection pitch;

wherein each rib of the plurality of ribs is slidably coupled to the support such that the rib is engaged with the helical groove, constraining the rib to rotate about the support as the rib slides along the length of the support;

wherein the collection configuration comprises at least part of the sorbent material being constrained to the helix defined by the collection pitch of the helical groove; and wherein the release configuration comprises the sorbent material being constrained to a compressed helix defined by the release pitch of the helical groove, the compressed helix having a smaller pitch than the helix.

16. The device of claim 8:
wherein the helical framework comprises a plurality of panels moveably coupled to the support, the plurality of panels having a fixed relative orientation with respect to each other while also free to rotate together about the axis, each panel of the plurality of panels comprising the sorbent material;

wherein the collection configuration comprises the plurality of panels spaced along the support with a collection spacing such that the helix passes through each panel of the plurality of panels; and wherein the release configuration comprises the plurality of panels having a release spacing that is smaller than the collection spacing.

17. The device of claim 8, wherein the helical sorbent structure is slidably coupled to the support, and the support is rotatably coupled to the vessel such that the helical sorbent structure rotates with the support, with respect to the vessel.

18. The device of claim 8, wherein the helical sorbent structure is rotatably coupled to the support, and the support is fixedly coupled to the vessel.

19. The device of claim 8, wherein the release configuration comprises the sorbent material being constrained to a compressed helix having a smaller pitch than the helix.

20. The device of claim 8, wherein the sorbent material is a moisture-swing sorbent material.

* * * * *